US010541880B2

(12) United States Patent
Kushnir

(10) Patent No.: US 10,541,880 B2
(45) Date of Patent: Jan. 21, 2020

(54) CONTROL OF DATA REPORTING FOR A DATA ANALYTICS SERVICE USING AN ACTIVE LEARNING FRAMEWORK

(71) Applicant: Nokia Technologies Oy, Espoo (FI)

(72) Inventor: Dan Kushnir, Springfield, NJ (US)

(73) Assignee: Nokia Technologies Oy, Espoo (FI)

( * ) Notice: Subject to any disclaimer, the term of this patent is extended or adjusted under 35 U.S.C. 154(b) by 218 days.

(21) Appl. No.: 15/839,517

(22) Filed: Dec. 12, 2017

(65) Prior Publication Data

US 2019/0182122 A1    Jun. 13, 2019

(51) Int. Cl.
    *H04L 12/24*    (2006.01)
    *H04L 29/08*    (2006.01)
    *H04W 4/38*     (2018.01)
    *G06N 20/00*    (2019.01)

(52) U.S. Cl.
    CPC .......... *H04L 41/147* (2013.01); *G06N 20/00* (2019.01); *H04L 29/08* (2013.01); *H04L 41/0853* (2013.01); *H04L 41/16* (2013.01); *H04L 67/12* (2013.01); *H04W 4/38* (2018.02)

(58) Field of Classification Search
    CPC ... H04L 29/08; H04L 41/0853; H04L 41/147; H04L 41/16; H04L 41/0893; H04L 41/145; H04L 67/12; H04L 43/024; G06F 15/18; G06N 20/00; H04W 4/006; H04W 4/38

See application file for complete search history.

(56) References Cited

U.S. PATENT DOCUMENTS

| 9,411,916 B2 * | 8/2016 | Cruz Mota | G06F 17/5009 |
| 9,547,828 B2 * | 1/2017 | Mermoud | G06N 5/048 |
| 2016/0335542 A1 * | 11/2016 | Dandekar | G06F 13/36 |
| 2017/0160328 A1 * | 6/2017 | Pal | G01R 31/088 |
| 2018/0375720 A1 * | 12/2018 | Yang | H04L 29/08 |

FOREIGN PATENT DOCUMENTS

| WO | 2017111828 A1 | 6/2017 |
| WO | WO-2017111828 A1 * | 6/2017 | ............. H04L 29/08 |

OTHER PUBLICATIONS

Gabriel et al; A Survey about Prediction-Based Data Reduction in Wireless Sensor Networks; Cornell University Library; Jul. 12, 2016.

(Continued)

Primary Examiner — Michael C Lai
(74) Attorney, Agent, or Firm — Duft & Bornsen, PC

(57) ABSTRACT

Systems and methods for regulating data traffic using active learning techniques. In one embodiment, a global monitor communicates with a plurality of sensors over a wide area network. The global monitor builds a global model for a data analytics service that maps elements to values based on data reported by the sensors. The global monitor generates a query for the data from the sensors, selects one or more candidate elements from the elements in the global model, generates a global policy specifying that the data requested from the sensors is limited to the data targeted to the candidate element(s), and sends the query indicating the global policy to the sensors. The global monitor receives the data targeted to the candidate element(s) from the sensors according to the global policy, and adjusts the global model based on the data targeted to the candidate element(s).

34 Claims, 11 Drawing Sheets

(56) References Cited

OTHER PUBLICATIONS

Aarti Singh et al; Active Learning for Adaptive Mobile Sensign Networks; University of Wisconsin-Madison; 2006.
Anish Muttreja et al; Active Learning Driven Data Acquisition for Sensor Networks. In Proceedings of the 11th IEEE Symposium on Computers and Communications (ISCC '06) 2006.
Burr Settles; Active Learning Literature Survey; Computer Sciences Technical Report 1648; Jan. 26, 2010.
Lior Rokach; Ensemble-based classifiers. Artificial Intelligence Review 33 1-39; Nov. 19, 2009.
Lorenzo Valerio; Accuracy vs Traffic Trade-off of Learning; http://wwwliit.cnr.it/sites/default/files/1570274854.pdf.
Marco Stolpe; The Internet of Things; http://www.kdd.org/exploration_files/18-1-Article2.pdf.
Thomas G Dietterich; Ensemble Methods in Machine Learning; http://www.cs.orst.edu/tgd.

\* cited by examiner

CONTROL OF DATA REPORTING FOR A DATA ANALYTICS SERVICE USING AN ACTIVE LEARNING FRAMEWORK

FIELD OF THE INVENTION

The invention is related to the field of communication systems and, in particular, to sensor networks.

BACKGROUND

A sensor network comprises a plurality of remote sensors that collect data, and report the data back to a centralized server over a network. In one example, each sensor may be an autonomous device that measures physical, environmental, or other conditions, and reports the measurement data back to the centralized server to analyze the data. In another example, each sensor may be a node in a cloud network that provides data on its state to a centralized orchestration entity. One issue with a sensor network is that the number of sensors may be large and the amount of data transmitted by the sensors over the network to the centralized server can cause congestion in the network causing delay/latency, or there may be restrictions on transmitting some data from the sensors. For example, some of the data traffic may be routed over a cellular network, which may create a load on the air interface and/or the backhaul to the core network. Some of the data traffic may be routed over the internet or another Internet Protocol (IP) network, which may cause a load in or between routing elements of these types of networks. Network congestion may therefore be a concern to network operators as more and more sensors are implemented for data analytics services.

SUMMARY

Embodiments described herein use machine-based active learning to determine what data is most relevant to a data analytics service at a given time. An active learning mechanism may generate a policy that controls data transmissions from the sensors over a network, and provide the policy to the sensors. Each sensor may therefore determine what data to transmit, how often to transmit the data, etc., based on the policy. Thus, the data sent by the sensors is controlled by the active learning mechanism so that the load placed on the network by the sensors may be controlled or reduced.

One embodiment comprises a system that includes a global monitor configured to provide a data analytics service. The global monitor comprises a global interface component configured to communicate with a plurality of sensors over a wide area network, and a global learner configured to perform an iterative process to build a global model for the data analytics service that maps elements to values based on data reported by the sensors. For one or more iterations of the iterative process, the global learner is configured to generate a query for the data from the sensors, to select at least one candidate element from the elements in the global model based on a contribution of the at least one candidate element to improving the global model and based on an impact on the wide area network caused by the sensors reporting the data targeted to the at least one candidate element in the global model, to generate a global policy specifying that the data requested from the sensors is limited to the data targeted to the at least one candidate element in the global model, and to send the query indicating the global policy to the sensors through global interface component. The global learner is configured to receive the data targeted to the at least one candidate element in the global model from the sensors through the global interface component according to the global policy, and to adjust the global model based on the data targeted to the at least one candidate element in the global model.

In another embodiment, the global policy specifies a rate at which the sensors transmit the data targeted to the at least one candidate element in the global model over the wide area network.

In another embodiment, the global learner is further configured to select the at least one candidate element based further on a regulatory restriction on the data targeted to the least one candidate element.

In another embodiment, the sensors comprise Internet of Things (IoT) devices configured for IoT communications.

In another embodiment, the sensors comprise servers in a cloud network.

In another embodiment, the system further includes a plurality of local monitors. Each of the local monitors comprises a local interface component configured to communicate with a subset of the sensors located in a local network, and a local learner configured to perform another iterative process to build a local model for the data analytics service. For one or more iterations of the other iterative process, the local learner is configured to generate a query for the data from the subset of the sensors located in the local network, to select at least one candidate element in the local model based on a contribution of the at least one candidate element to improving the local model and based on an impact on the local network caused by the subset of the sensors reporting the data targeted to the at least one candidate element in the local model, to generate a local policy specifying that the data requested from the subset of the sensors is limited to the data targeted to the at least one candidate element in the local model, and to send the query indicating the local policy to the subset of the sensors located in the local network through local interface component. The local learner is configured to receive the data targeted to the at least one candidate element in the local model from the subset of the sensors through the local interface component according to the local policy, and to adjust the local model based on the data targeted to the at least one candidate element in the local model.

In another embodiment, the local learner is configured to send the local model to the global monitor through the local interface component.

In another embodiment, the global learner is configured to receive a plurality of local models from the local monitors through the global interface component, and to combine the local models to build the global model.

In another embodiment, the local learner is configured to send the local model to other local monitors through the local interface component.

In another embodiment, the local monitors are located on a periphery of the wide area network.

In another embodiment, at least one of the local monitors is implemented in a base station of a Radio Access Network (RAN).

Another embodiment comprises a method of using active learning to regulate data traffic. The method comprises building (at a global monitor) a global model for a data analytics service that maps elements to values using an iterative process, where the global monitor communicates with a plurality of sensors over a wide area network. For one or more iterations of the iterative process, the method comprises generating a query for data from the sensors, selecting at least one candidate element from the elements in the global model based on a contribution of the at least one candidate element to improving the global model and based on an impact on the wide area network caused by the sensors reporting the data targeted to the at least one candidate element in the global model, generating a global policy specifying that the data requested from the sensors is limited to the data targeted to the at least one candidate element in the global model, sending the query indicating the global policy from the global monitor to the sensors, receiving the data targeted to the at least one candidate element in the global model from the sensors according to the global policy, and adjusting the global model based on the data targeted to the at least one candidate element in the global model.

In another embodiment, the global policy specifies a rate at which the sensors transmit the data targeted to the at least one candidate element in the global model over the wide area network.

In another embodiment, the step of selecting the at least one candidate element comprises selecting the at least one candidate element based further on a regulatory restriction on the data targeted to the least one candidate element.

In another embodiment, the sensors comprise IoT devices configured for IoT communications.

In another embodiment, the sensors comprise servers in a cloud network.

In another embodiment, the method further comprises building a local model for the data analytics service at each of a plurality of local monitors using another iterative process, where each of the local monitors communicates with a subset of the sensors located in a local network. For one or more iterations of the other iterative process, the method comprises generating (at a local monitor) a query for the data from the subset of the sensors located in the local network, selecting at least one candidate element in the local model based on a contribution of the at least one candidate element to improving the local model and based on an impact on the local network caused by the subset of the sensors reporting the data targeted to the at least one candidate element in the local model, generating a local policy specifying that the data requested from the subset of the sensors is limited to the data targeted to the at least one candidate element in the local model, sending the query indicating the local policy from the local monitor to the subset of the sensors located in the local network, receiving the data targeted to the at least one candidate element in the local model in the local monitor from the subset of the sensors according to the local policy, and adjusting the local model based on the data targeted to the at least one candidate element in the local model.

In another embodiment, the method comprises sending the local model from the local monitor to the global monitor.

In another embodiment, the method further comprises receiving (at the global monitor) a plurality of local models from the local monitors, and combining the local models to build the global model.

In another embodiment, the method further comprises sending the local model from the local monitor to other local monitors.

Another embodiment comprises a system that includes a global monitor configured to build a global model for a data analytics service that maps elements to values. The system further includes a plurality of local monitors that each communicates with a subset of sensors located in a local network. Each local monitor of the plurality of the local monitors is configured to perform an iterative process to build a local model for the data analytics service that maps at least one of the elements to the values. For one or more iterations of the iterative process, the local monitor is configured to generate a query for data from the subset of the sensors located in the local network, to select at least one candidate element in the local model based on a contribution of the at least one candidate element to improving the local model and based on an impact on the local network caused by the subset of the sensors reporting the data targeted to the at least one candidate element in the local model, to generate a local policy specifying that the data requested from the subset of the sensors is limited to the data targeted to the at least one candidate element in the local model, to send the query indicating the local policy to the subset of the sensors located in the local network, to receive the data targeted to the at least one candidate element in the local model from the subset of the sensors according to the local policy, and to adjust the local model based on the data targeted to the at least one candidate element in the local model. The global monitor is configured to receive a plurality of local models from the local monitors, and to combine the local models to build the global model.

In another embodiment, the local monitors are located on a periphery of a wide area network.

In another embodiment, the local learner is further configured to select the at least one candidate element based further on a regulatory restriction on the data targeted to the least one candidate element.

In another embodiment, one or more of the local monitors is implemented in a base station of a RAN.

In another embodiment, the local policy specifies a rate at which the subset of the sensors transmit the data targeted to the at least one candidate element in the local model over the local network.

In another embodiment, the global monitor is configured to select at least one candidate element in the global model based on a contribution of the at least one candidate element to improving the global model, to generate a global policy specifying that the data requested from the sensors is limited to the data targeted to the at least one candidate element in the global model, and to send the global policy to the local monitors. Each of the local monitors is configured to update the local policy according to the global policy.

Another embodiment comprises a method of using active learning to regulate data traffic. The method comprises building (at each of a plurality of local monitors) a local model for a data analytics service that maps elements to values using an iterative process, where each local monitor of the plurality of local monitors communicates with a subset of sensors located in a local network. For one or more iterations of the iterative process, the method comprises generating a query for data from the subset of the sensors located in the local network, selecting at least one candidate element of the elements in the local model based on a contribution of the at least one candidate element to improving the local model and based on an impact on the local network caused by the subset of the sensors reporting the data targeted to the at least one candidate element in the local model, generating a local policy specifying that the data requested from the subset of the sensors is limited to the data targeted to the at least one candidate element in the local model, sending the query indicating the local policy from the local monitor to the subset of the sensors located in the local network, receiving the data targeted to the at least one candidate element in the local model in the local monitor from the subset of the sensors according to the local policy, and adjusting the local model based on the data targeted to the at least one candidate element in the local model. The method further comprises receiving (at a global monitor) a plurality of local models from the local monitors, and combining the local models to build a global model for the data analytics service.

In another embodiment, the step of selecting the at least one candidate element comprises selecting the at least one candidate element based further on a regulatory restriction on the data targeted to the least one candidate element.

In another embodiment, the local policy specifies a rate at which the subset of the sensors transmit the data targeted to the at least one candidate element in the local model over the local network.

In another embodiment, the method further comprises selecting (at the global monitor) at least one candidate element in the global model based on a contribution of the at least one candidate element to improving the global model, generating a global policy specifying that the data requested from the sensors is limited to the data targeted to the at least one candidate element in the global model, sending the global policy from the global monitor to the local monitors, and updating the local policy according to the global policy.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
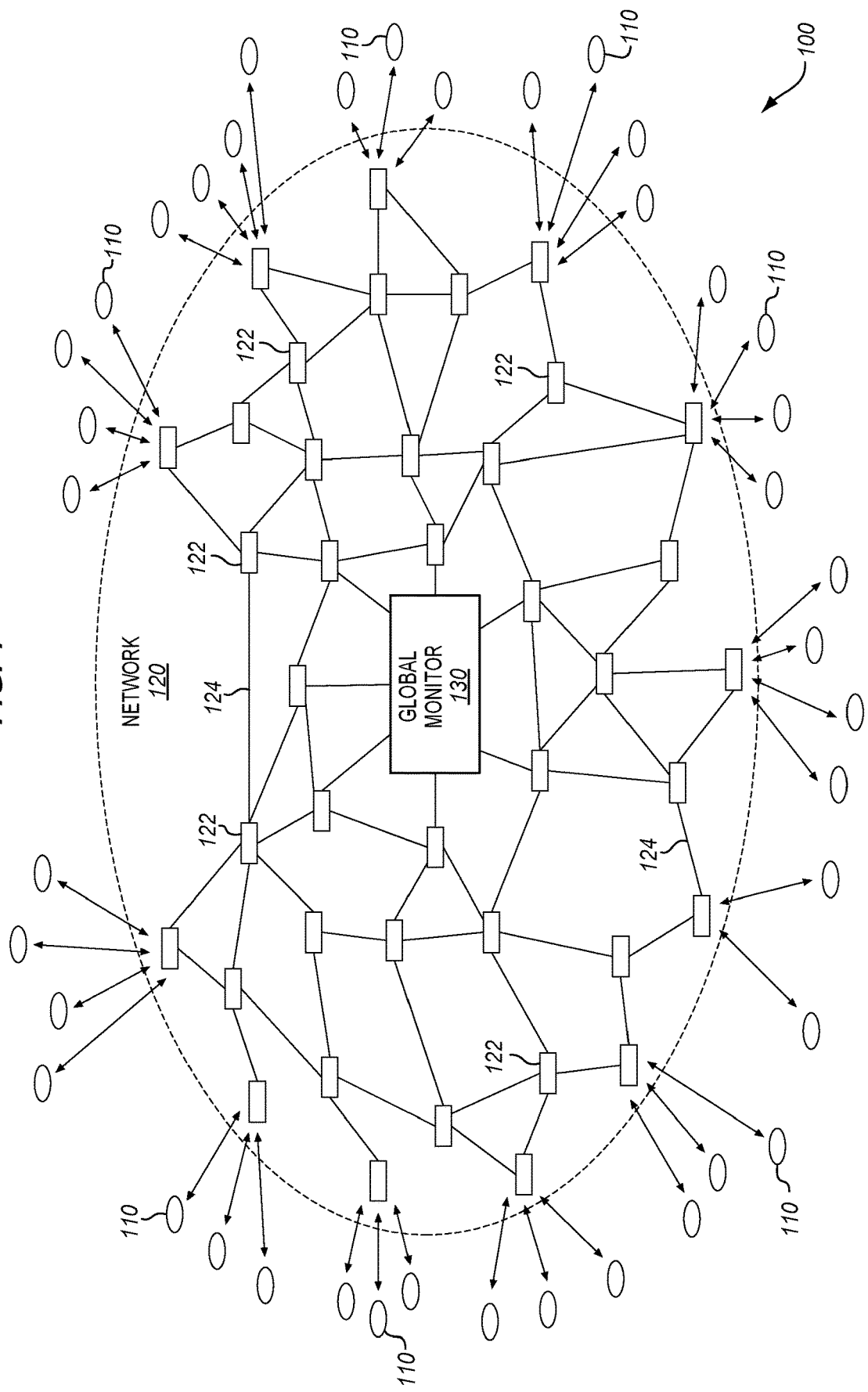
FIG. 1 illustrates a sensor network system in an illustrative embodiment.

FIG. 1 illustrates a sensor network system 100 in an illustrative embodiment. Sensor network system 100 includes a plurality of sensors 110, which comprise devices that detect or measure a physical property, and output measurement data over a network. A sensor 110 may be an autonomous device that is powered by a battery or another power source, such as an Internet of Things (IoT) device. A sensor 110 may communicate via a wireless connection (e.g., cellular or Wireless Local Area Network (WLAN)) or a wired connection. One example of a sensor 110 is a Machine Type Communication (MTC) device, which is User Equipment (UE) equipped for MTC that communicates through a Public Land Mobile Network (PLMN) with one or more MTC servers and/or other MTC devices. Alternatively, a sensor 110 may comprise nodes or servers in a cloud network that provide state data to centralized orchestration entity.

In this embodiment, sensors 110 are configured to report data over network 120 to a global monitor 130. Network 120 comprises a series of points or nodes interconnected by communication paths for the purpose of transmitting, receiving, and exchanging traffic. Network 120 is comprised of a plurality of network elements or network devices 122 connected by communication paths 124. A network device 122 may comprise a switch, a router, a gateway, a base station, etc., which may use a variety of protocols to transport traffic. Each network device 122 may have a unique identifier or address, such as an IP address or a Media Access Control (MAC) address, that is used to indicate the source or destination of traffic. Network 120 may use wired and/or wireless technologies for communication paths 124, and may be public, private, or a combination of both. Network 120 may have a mesh topology as indicated in FIG. 1, or may have other topologies. Network 120 may be considered a wide area network (e.g., WAN) to distinguish it from a "local network", which will be discussed below.

Global monitor 130 comprises an element or machine that receives data from sensors 110, and uses active learning to build a global model for a data analytics service based on the data. The data analytics service may enable an entity to make informed decisions regarding a variety of subjects, such as health/medical, environmental, industrial, etc. The data analytics service may identify patterns and relationships in the data, and apply statistical techniques to predict future behavior, equipment failures, future events, etc., based on the global model.

Sensor network system 100 may provide an IoT solution, which refers to the interconnection and autonomous exchange of data between devices that are machines or parts of machines. IoT uses Machine-to-Machine (M2M) communications or MTC, which is defined as data communication between devices without human interaction. Examples of M2M/MTC services include utility meters, vending machines, fleet management, smart traffic, real-time traffic information to a vehicle, security monitoring, medical metering and alerting, etc. The Third Generation Partnership Project (3GPP) has defined new categories for IoT/MTC solutions in Release 13, which include LTE Cat-M1 (eMTC) and Cat-NB1 (NB-IoT). Sensors 110 may be examples of IoT devices that operate according to one of these categories to report data using IoT communications over a network.

The architecture in FIG. 1 shows a centralized topology, where each of the sensors 110 reports data to global monitor 130 for a data analytics service. Global monitor 130 is deployed at the "center" of network 120, and feeds on data coming from sensors 110 located at the edge or periphery of network 120. This topology may be problematic as it requires sensors 110 to transmit data across network 120 to global monitor 130, while much of the data may have very little potential of improving the global model used by global monitor 130. This type of situation leads to unnecessary traffic load and latency within network 120. To address this issue, global monitor 130 uses active learning to regulate how sensors 110 report data across network 120. To generally describe the centralized topology, a global learner X generates a global model F based on data reported by sensors (S_1, . . . , S_n). The global learner X may assess uncertainty within the global model F, and issue a policy P to sensors (S_1, . . . , S_n) specifying what data to report to the global learner X and what data not to report to the global learner X. Sensors (S_1, . . . , S_n) will then report data according to the policy P, which allows for improvement of the global model F without inducing much traffic load on network 120 as reporting is limited to data that is essential to model improvement. Thus, the amount of traffic sent across network 120 to support the data analytics service may be reduced.

Figure 2:
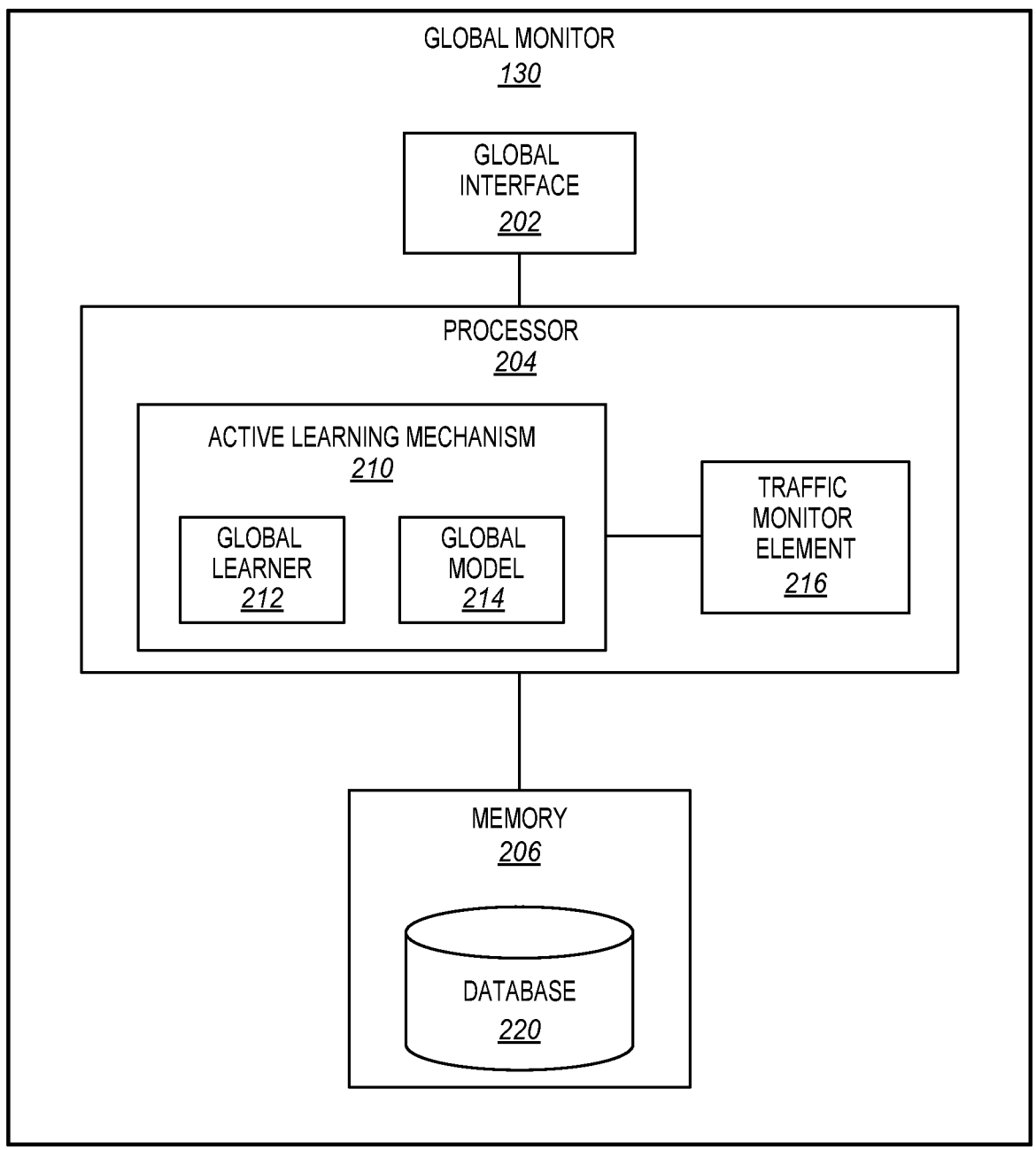
FIG. 2 is a block diagram of a global monitor in an illustrative embodiment.

FIG. 2 is a block diagram of global monitor 130 in an illustrative embodiment. Global monitor 130 includes a global interface component 202, one or more processors 204, and a memory 206. Global interface component 202 is a hardware component configured to communicate with a variety of elements. For example, global interface component 202 may be configured to communicate with one or more network devices 122 over a wired or wireless connection, communicate with other monitors, communicate with sensors 110, etc. Processor 204 represents the internal circuitry, logic, hardware, etc., that provides the functions of global monitor 130. Memory 206 is a computer readable storage medium (e.g., ROM or flash memory) for data, instructions, applications, etc., and is accessible by processor 204. Global monitor 130 may include various other components not specifically illustrated in FIG. 2.

Processor 204 implements an active learning mechanism 210 and optionally a traffic monitor element 216. Active learning mechanism 210 may be implemented in any combination of hardware, firmware, and/or software to implement machine-based active learning techniques. Machine learning generally refers to an automated process of parsing data, learning from the data, and then adapting the output based on the learning without being explicitly programmed. Machine learning differs from traditional computer processes where instructions or programming is predefined and explicit so that the same steps are repeated given the same input. Rather than having activities defined in advance, a mechanism implementing machine learning may be trained to observe patterns in data and adjust actions or steps to take over time. Active learning is a type of semi-supervised machine learning in which a learner is able to interactively query a source (e.g., a sensor 110) to obtain the data most likely to change a model being "learnt" by the learner.

Traffic monitor element 216 is configured to monitor network conditions on network 120. Traffic monitor element 216 may be in communication with one or more traffic detection elements (not shown) across network 120 to monitor traffic conditions, such as areas of congestion.

Active learning mechanism 210 includes a global learner 212. Global learner 212 is an active learning device that is configured to query a source for a quantity of data, receive the data, and generate, modify, or augment a global model 214 based on the data that maps elements (e.g., data points) to values, which may be interpreted as labels. Global model 214 is used to label or classify elements for the data analytics service. For example, if the data analytics service is health related, then global model 214 may be used to label patients (i.e., elements) as "high risk", "at risk", "low risk", etc., based on data received from sensors 110. Global learner 212 may process a collection of data from one or more sensors 110 to associate an element with global model 214 (e.g., such as to place a data point for the element on a graph). Global learner 212 may use global model 214 to label one or more elements, such as based on the proximity of the data point for the element to other data points. For example, sensors 110 may be human/patient-carried monitoring sensors that transmit data from patients to global learner 212 that analyses the data. In this case, global learner 212 may build global model 214 for prediction of various phenomena, such as probability of disease onset, probability of disease spread, probability of a medical-device failure, etc.

Figure 3:
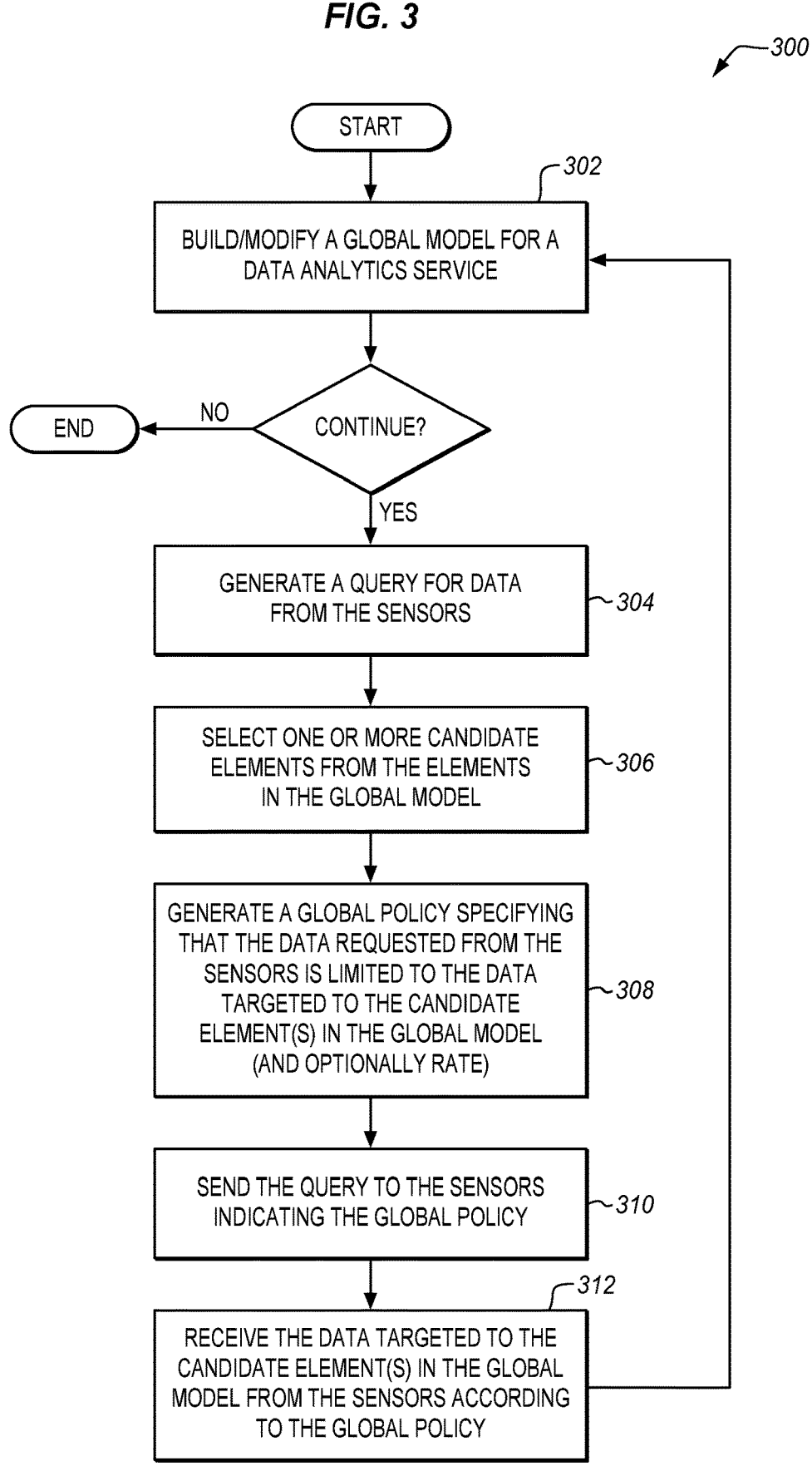
FIG. 3 is a flow chart illustrating a method of using active learning to regulate data traffic from sensors in an illustrative embodiment.

Global monitor 130 uses active learning techniques to regulate data traffic from sensors 110, as is further described in FIG. 3. FIG. 3 is a flow chart illustrating a method 300 of using active learning to regulate data traffic from sensors 110 in an illustrative embodiment. The steps of method 300 will be described with reference to global monitor 130 in FIG. 2, but those skilled in the art will appreciate that method 300 may be performed in other systems. Also, the steps of the flow charts described herein are not all inclusive and may include other steps not shown, and the steps may be performed in an alternative order.

It is assumed for this embodiment that global learner 212 has performed a training phase, testing phase, etc., to build global model 214 for the data analytics service. Global model 214 maps a plurality of elements to values, and the values may be indicative of labels. Global learner 212 also performs an iterative process (i.e., a global process) to further build, augment, or modify the global model 214 based on data reported by sensors 110 (step 302). For one or more steps of the iterative process, global learner 212 queries sensors 110 for data, and uses the data reported by sensors 110 to modify global model 214. For example, global learner 212 generates a query for data from sensors 110 (step 304). The query comprises any type of request for data from sensors 110, such as a control message that triggers sensors 110 to report data. For instance, if sensors 110 comprise IoT/MTC devices, then the query may comprise a device trigger to report data in an IoT/MTC communication.

Global learner 212 also selects one or more candidate elements from the elements in the global model 214 (step 306). A candidate element is an element of global model 214 for which global learner 212 wants or desires to obtain data from sensors 110. Global learner 212 may select the candidate element(s) in a number of ways. In one embodiment, global learner 212 selects the candidate element(s) based on the contribution made to improving the global model 214, and/or the cost or impact (in terms of network resource utilization) in reporting data targeted to the candidate element(s). More particularly, global learner 212 may select the candidate element(s) based on an error risk estimate of the global model 214 when the candidate element(s) are augmented to the global model 214, and/or based on an impact on network 120 caused by sensors 110 reporting the data targeted to the candidate element(s). For example, global learner 212 may select one or more least certain elements in global model 214 as candidate elements, where a least certain element is a labeled element having a prediction uncertainty, uncertainty value, or uncertainty level that exceeds a threshold. Global learner 212 may also access traffic monitor element 216, and determine network conditions in network 120 (i.e., congestion). Based on the network conditions, global learner 212 may select the candidate element(s) that cause sensors 110 to report the least amount of data in one or more regions of network 120, that cause sensors 110 in particular regions of network 120 to report data while avoiding reporting by sensors 110 in other regions of network 120 (i.e., traffic steering), etc. Global learner 212 may also select the candidate element(s) based on cost (i.e., monetarily), regulatory restrictions on the data targeted to the least one candidate element, such as governmental restrictions or privacy restrictions, etc.

Global learner 212 generates a global policy specifying that the data requested from sensors 110 is limited to the data targeted to (or for) the candidate element(s) in the global model 214 (step 308). In other words, the global policy specifies that sensors 110 limit, constrain, or restrict the data transmitted over network 120 to data targeted to the candidate element(s) in the global model 214 for a time period. The global policy may also specify a rate at which sensors 110 transmit the data targeted to the candidate element(s) in global model 214 over network 120. The criteria by which the global policy is constructed may be domain specific, and may rely on a variety of criteria, such as maximal model change, uncertainty sampling, etc.

Global learner 212 sends the query to sensors 110 indicating the global policy (step 310) through global interface component 202. For example, the query may comprise a control message, and global learner 212 may embed the global policy in the control message. Global learner 212 may broadcast the control message to sensors 110, multicast the control message to sensors 110, send the control message to each individual sensor 110, etc., through global interface component 202 using a communication protocol, such as Session Initiation Protocol (SIP), SS7, etc.

Each sensor 110 is configured to collect data, and process the global policy to determine what data to send to global monitor 130 over network 120, and what data not to send. For example, the global policy may include a filter, and a sensor 110 may use the filter to identify data that is authorized for transmission, and to remove/block data that is not authorized for transmission according to the global policy. If a sensor 110 has a collection of data at a point in time, then sensor 110 processes the global policy to identify a data subset of the collection that is targeted to the candidate element(s) in global model 214. This sensor 110 then sends the authorized data subset to global monitor 130 over network 120, as do other sensors 110.

Global learner 212 receives the data (i.e., the data subsets) from sensors 110 through global interface component 202 (step 312). The data received is targeted to the candidate element(s) in global model 214 according to the global policy. Global learner 212 might not receive data from every sensor 110 that received the global policy, as some sensors 110 may not have any data to report that is approved under the global policy. But it is assumed that one or more sensors 110 report data targeted to the candidate element(s) in global model 214. Global learner 212 then builds, augments, modifies, or adjusts global model 214 based on the data targeted to the candidate element(s) in global model 214 (step 302). Global learner 212 may also store the data received from sensors 110 in database 220. As is evident above, reporting is limited to data that is essential to model improvement, which saves on the resources of network 120.

Steps 304-312 of method 300 may be repeated to improve global model 214 as desired.

Figure 4:
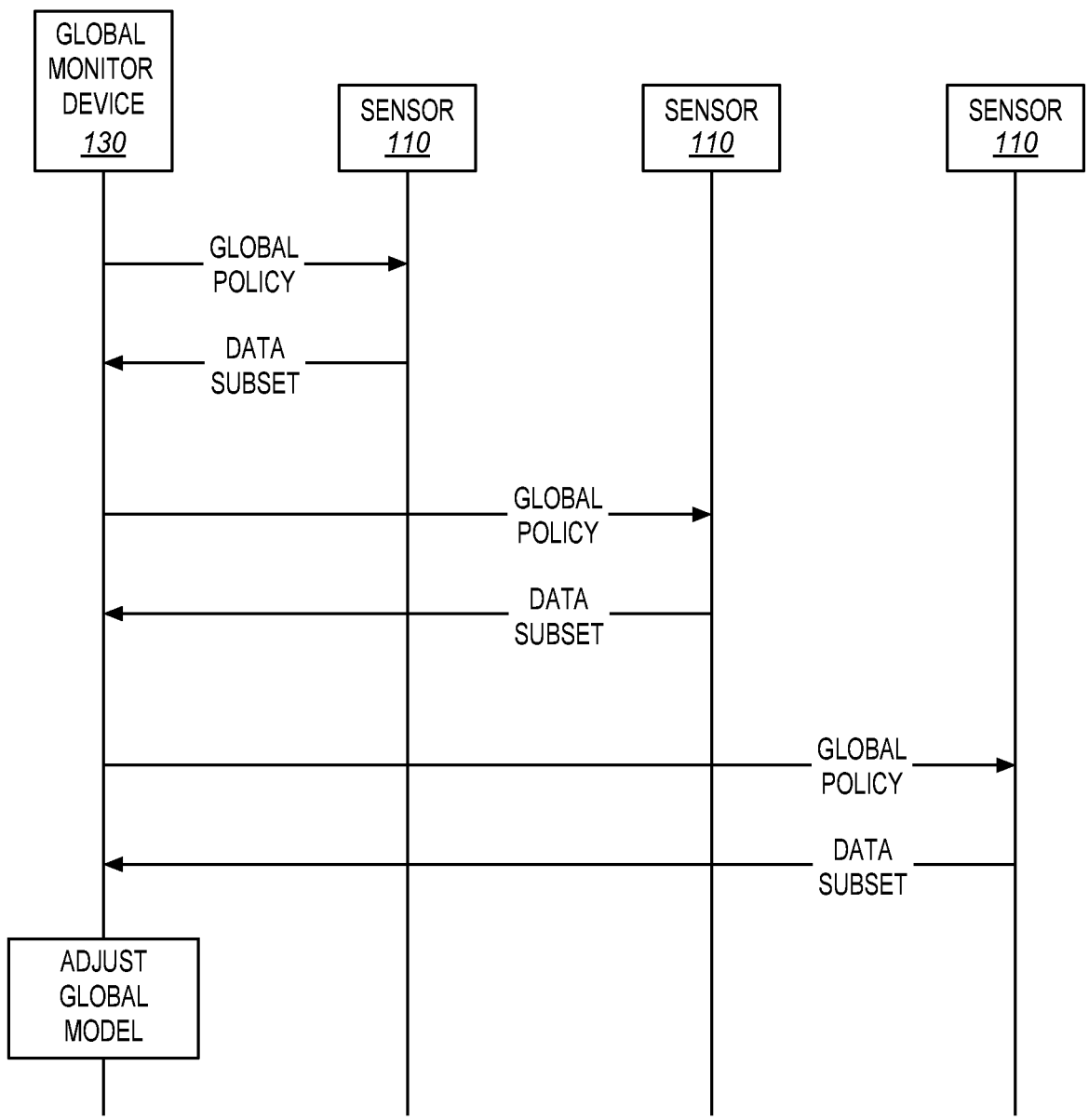
FIG. 4 is a message diagram illustrating communications between sensors and a global monitor in an illustrative embodiment.

FIG. 4 is a message diagram illustrating communications between sensors 110 and global monitor 130 in an illustrative embodiment. For a centralized topology, global monitor 130 sends the global policy to sensors 110, and each sensor 110 reports a data subset to global monitor 130 based on the global policy. Each data subset is limited to data targeted to the candidate element(s) in global model 214 as specified in the global policy. Global monitor 130 then adjusts global model 214 based on the data subsets reported by sensors 110.

As an example of the centralized topology, assume that global model F is learnt in global learner 212, and $c\_0$ is a confidence threshold. Without loss of generality, $y\_j(F,t)$ may be an element or data point in global model F for which the confidence level is lower than $c\_0$ at a time t. Global learner 212 may issue a global policy in which the current estimate of $y\_j(F,t)$ is required to be updated by sensors 110. For example, let $y\_j(F,t)=p(label(v\_i(t-1), \ldots, v\_i(1))$ be the posterior probability of having a label L for data point $v\_i$. If $y(F,t)$ has a confidence estimated by the magnitude of the posterior probability and that confidence is lower than $c\_0$, then global learner 212 issues a global policy P that dictates data point $v\_i$ be sampled and data limited to data point $v\_i$ be transmitted to global learner 212 in the next time step (t+1). For example, label L may be a binary label for being sick or healthy, and the data point $v\_i$ may be a set of measurements of physical parameters such as body heat, pulse, blood pressure, etc., that are transmitted from sensors 110 through network 120 to global learner 212. In this example, no other data will be transmitted to global learner 212 in the next time step, if data point $v\_i$ was the only data point whose confidence level was below $c\_0$. After some period of time, the confidence level of another data point may be below $c\_0$, which will trigger a new global policy.

Figure 5:
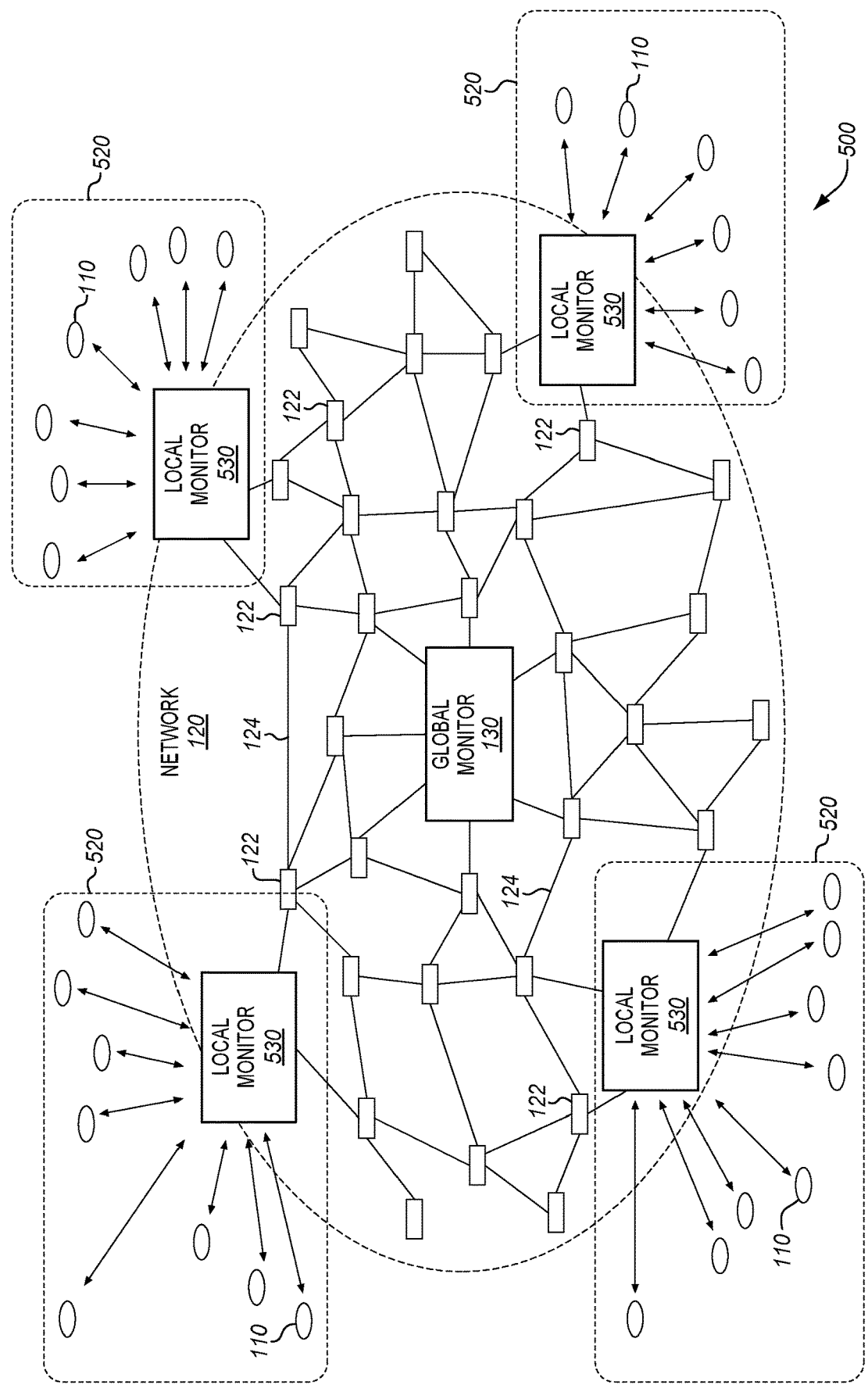
FIG. 5 illustrates another sensor network system in an illustrative embodiment.

FIG. 5 illustrates another sensor network system 500 in an illustrative embodiment. Sensor network system 500 is similar to sensor network system 100 in FIG. 1, except that sensor network system 500 includes a plurality of local monitors 530. A local monitor 530 comprises an element or machine that receives data from sensors 110 within a local network (e.g., Local Area Network (LAN), a Radio Access Network (RAN), a cloud network, etc.), and uses active learning to build a local model for a data analytics service based on the data. For example, four local networks 520 are shown in FIG. 5, with a local monitor 530 implemented for each of the local networks 520. A local network 520 is a network at an edge of network 120. A local network 520 may comprise a LAN comprised of a group of sensors 110 that share a common communications link to a server, gateway, etc., may comprise a RAN where one or more base stations serve a plurality of sensors 110, a cloud network where nodes or servers (i.e., sensors 110) in the cloud provide state data to centralized orchestration entity, etc.

Local monitor 530 communicates with a subset of the sensors 110 implemented for the entire system 500, and will report a local model to global monitor 130. Global monitor 130 may then combine the local models to generate the global model for the data analytics service.

The architecture in FIG. 5 shows a peripheral topology, where local monitors 530 are located at the periphery of network 120. Active learning is therefore employed in nodes (i.e., local monitors 530) at the edge or periphery of network 120. This topology allows for ensemble learning, which is a machine learning paradigm where multiple learners are trained to solve the same problem. In contrast to ordinary machine learning approaches which learn from one model, ensemble methods generate a set of models and combine the set of models to classify elements (i.e., data points). To generally describe the peripheral topology, a local learner $X\_i$ is deployed close to a set of sensors ($S\_1i, \ldots, S\_ni$), and a local model $F\_i$ is generated based on data reported by sensors ($S\_1i, \ldots, S\_ni$). The local learner $X\_i$ may assess uncertainty within its local model $F\_i$, and query sensors ($S\_1i, \ldots, S\_ni$) according to a local policy $P\_i$ to improve local model $F\_i$. Querying sensors ($S\_1i, \ldots, S\_ni$) according to the local policy $P\_i$ allows for improvement of the local model $F\_i$ without inducing much traffic load on network 120, as this happens only at the edge of network 120. At another stage, the local learner $X\_i$ transmits the local model $F\_i$ to a global learner X so that the global learner X may build a global model F based on the local models ($F\_1, \ldots, F\_k$). This combination of local models into a global model may be done via ensemble learning, which is known to provide a stronger predictive power than that of each local model $F\_i$ alone.

Figure 6:
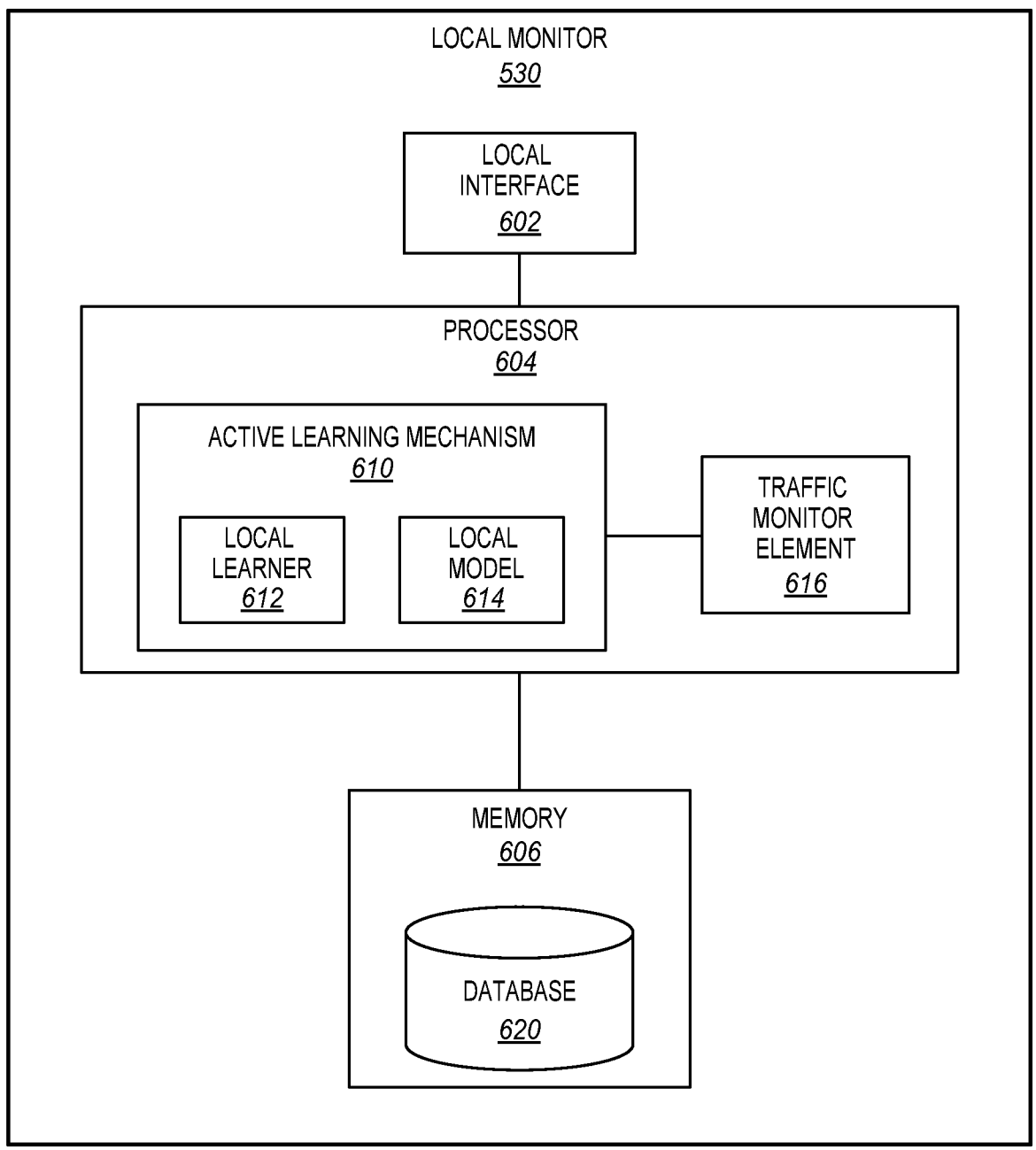
FIG. 6 is a block diagram of a local monitor in an illustrative embodiment.

FIG. 6 is a block diagram of local monitor 530 in an illustrative embodiment. Local monitor 530 includes a local interface component 602, one or more processors 604, and a memory 606. Local interface component 602 is a hardware component configured to communicate with a variety of elements. For example, local interface component 602 may be configured to communicate with one or more network devices 122 over a wired or wireless connection, communicate with other monitor devices (e.g., global monitor 130), communicate with sensors 110, etc. Processor 604 represents the internal circuitry, logic, hardware, etc., that provides the functions of local monitor 530. Memory 606 is a computer readable storage medium for data, instructions, applications, etc., and is accessible by processor 604. Local monitor 530 may include various other components not specifically illustrated in FIG. 6.

Processor 604 implements an active learning mechanism 610 and optionally a traffic monitor element 616. Active learning mechanism 610 may be implemented in any combination of hardware, firmware, and/or software to implement active machine learning techniques as discussed above. Active learning mechanism 610 includes a local learner 612. Local learner 612 is an active learning device that is configured to query a source for a quantity of data, receive the data, and generate a local model 614 based on the data that maps elements (e.g., data points) to values. Local model 614 is used to label or classify elements for a data analytics service.

Traffic monitor element 616 is configured to monitor network conditions on a local network 520. Traffic monitor element 616 may be in communication with one or more traffic detection elements (not shown) within a local network 520 to monitor traffic conditions, such as areas, cells, sectors, etc., that are experiencing congestion.

Local monitors 530 use active learning techniques to regulate data traffic from sensors 110, and provide local models to global monitor 130. Global monitor 130 combines the local models into a global model, such as with ensemble learning. Thus, global monitor 130 does not need to receive data from sensors 110 over network 120, which acts to regulate what data traffic is sent over network 120 from sensors 110.

Figure 7:
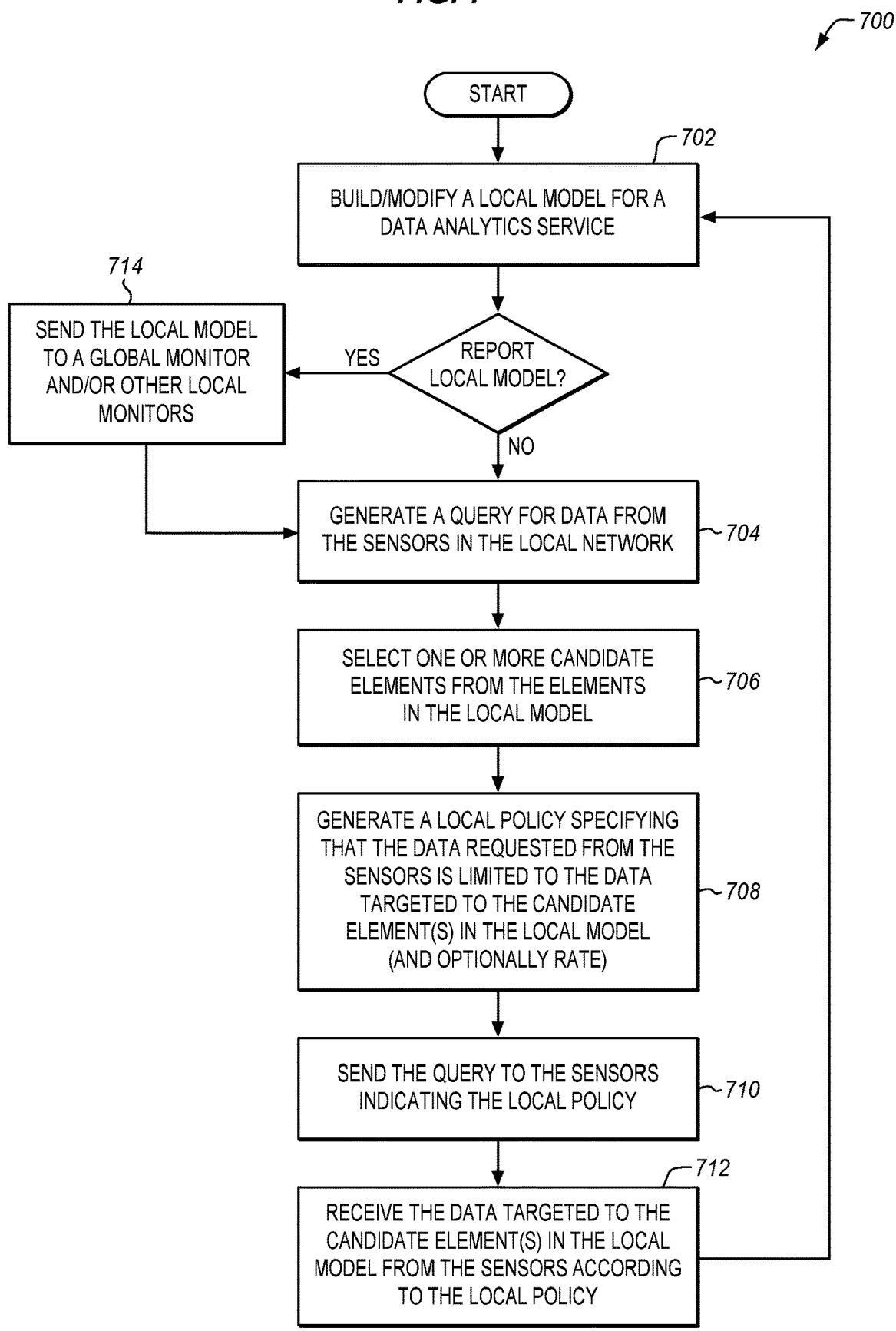
FIGS. 7-8 are flow charts illustrating a method of using active learning at a periphery of a network to regulate data traffic from sensors in an illustrative embodiment.
Figure 8:
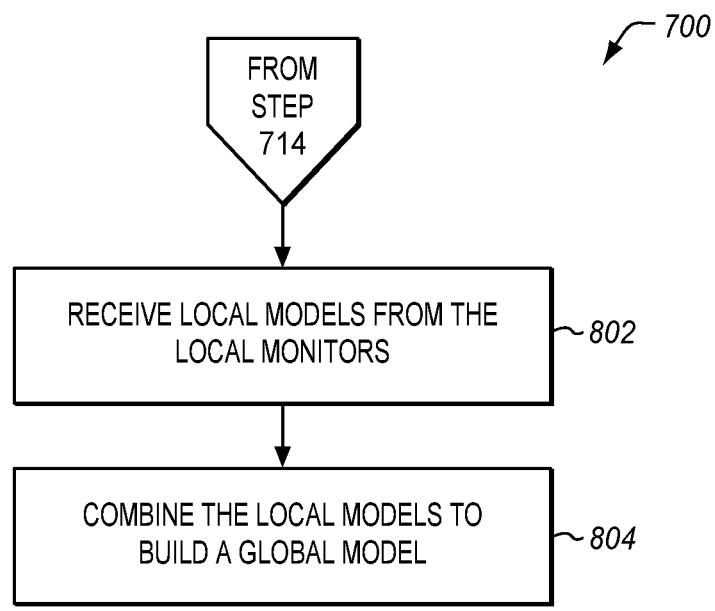

FIGS. 7-8 are flow charts illustrating a method 700 of using active learning at a periphery of network 120 to regulate data traffic from sensors 110 in an illustrative embodiment. The steps of method 700 will be described with reference to local monitors 530 in FIG. 6 and global monitor 130 in FIG. 2, but those skilled in the art will appreciate that method 700 may be performed in other systems.

FIG. 7 describes the steps performed in each local monitor 530. It is assumed for this embodiment that local learner 612 in each local monitor 530 has performed a training phase, testing phase, etc., to build local model 614 for the data analytics service. A local model 614 maps elements to values, and the values may be indicative of labels. Local learner 612 also performs an iterative process (i.e., a local process) to further build, augment, or modify the local model 614 based on data reported by sensors 110 (step 702). For one or more steps of the iterative process, local learner 612 queries sensors 110 for data, and uses the data reported by sensors 110 to modify local model 614. For example, local learner 612 generates a query for data from sensors 110 in local network 520 (step 704). Local learner 612 also selects one or more candidate elements from the elements in the local model 614 (step 706). A candidate element is an element of local model 614 for which local learner 612 wants or desires to obtain data from sensors 110. Local learner 612 may select the candidate element(s) in a number of ways. In one embodiment, local learner 612 selects the candidate element(s) based on the contribution made to improving the local model 614, and/or the cost or impact (in terms of network resource utilization) in reporting data targeted to the candidate element(s). More particularly, local learner 612 selects the candidate element(s) based on an error risk estimate of the local model 614 when the candidate element(s) are augmented to the local model 614, and/or based on an impact on local network 520 caused by sensors 110 reporting the data targeted to the candidate element(s). For example, local learner 612 may select one or more least certain elements in local model 614 as candidate elements. Local learner 612 may also access traffic monitor element 616, and determine network conditions in local network 520 (i.e., congestion). Based on the network conditions, local learner 612 may select the candidate element(s) that cause sensors 110 to report the least amount of data in one or more regions, cells, sectors, etc., of local network 520, that cause sensors 110 in particular regions, cells, sectors, etc., of local network 520 to report data while avoiding reporting by sensors 110 in other regions, cells, sectors, etc., of local network 520 (i.e., traffic steering), etc. Local learner 612 may also select the candidate element(s) based on cost (i.e., monetarily), regulatory restrictions, such as governmental restrictions or privacy restrictions, etc.

Local learner 612 generates a local policy specifying that the data requested from sensors 110 within a local network 520 is limited to the data targeted to the candidate element(s) in the local model 614 (step 708). In other words, the local policy specifies that sensors 110 limit, constrain, or restrict the data transmitted over a local network 520 to the data targeted to the candidate element(s) in the local model 614 for a time period. The local policy may also specify a rate at which sensors 110 transmit the data targeted to the candidate element(s) in the local model 614 over local network 520.

Local learner 612 sends the query to sensors 110 in a local network 520 indicating the local policy (step 710) through local interface component 602. For example, the query may comprise a control message, and local learner 612 may embed the local policy in the control message. Local learner 612 may broadcast the control message to sensors 110, multicast the control message to sensors 110, send the control message to each individual sensor 110, etc., through local interface component 602.

Each sensor 110 in local network 520 is configured to collect data, and process the local policy to determine what data to send to local monitor 530 over local network 520, and what data not to send. For example, the local policy may include a filter, and a sensor 110 may use the filter to identify data that is authorized for transmission, and to remove/block data that is not authorized for transmission according to the local policy. If a sensor 110 has a collection of data at a point in time, then sensor 110 processes the local policy to identify a data subset of the collection that is targeted to the candidate element(s) in local model 614. This sensor 110 then sends the authorized data subset to local monitor 530 over local network 520, as do other sensors 110.

Local learner 612 receives the data (i.e., the data subsets) from sensors 110 in a local network 520 through local interface component 602 (step 712). The data received is targeted to the candidate element(s) in local model 614 according to the local policy. Local learner 612 might not receive data from every sensor 110 in local network 520 that received the local policy, as some sensors 110 may not have any data to report that is approved under the local policy. But it is assumed that one or more sensors 110 report data targeted to the candidate element(s) in local model 614. Local learner 612 then builds, augments, modifies, or adjusts local model 614 based on the data targeted to the candidate element(s) in local model 614 (step 702). Local learner 612 may also store the data received from sensors 110 in database 620. As is evident above, reporting is limited to data that is essential to model improvement, which saves on the resources of local network 520.

Steps 704-712 of method 700 may be repeated to improve local model 614 as desired. At some decision point, local learner 612 sends local model 614 to global monitor 130 over network 120 and/or to other local monitors 530 through local interface component 602 (step 714). Local learner 612 may send local model 614 to global monitor 130 in response to a request by global monitor 130. Alternatively, local learner 612 may send local model 614 to global monitor 130 periodically, such as in response to expiration of a timer, when local model 614 has changed significantly enough to justify transmission, etc. For example, local learner 612 may send local model 614 to global monitor 130 when local model 614 has changed beyond a threshold.

FIG. 8 describes the steps of method 700 performed in global monitor 130. Global learner 212 of global monitor 130 receives local models 614 from local monitors 530 through local interface component 602 (step 802). Global learner 212 then combines local models 614 to build or adjust a global model, such as global model 214 (step 804). Global learner 212 may use ensemble learning techniques to combine the local models.

Figure 9:
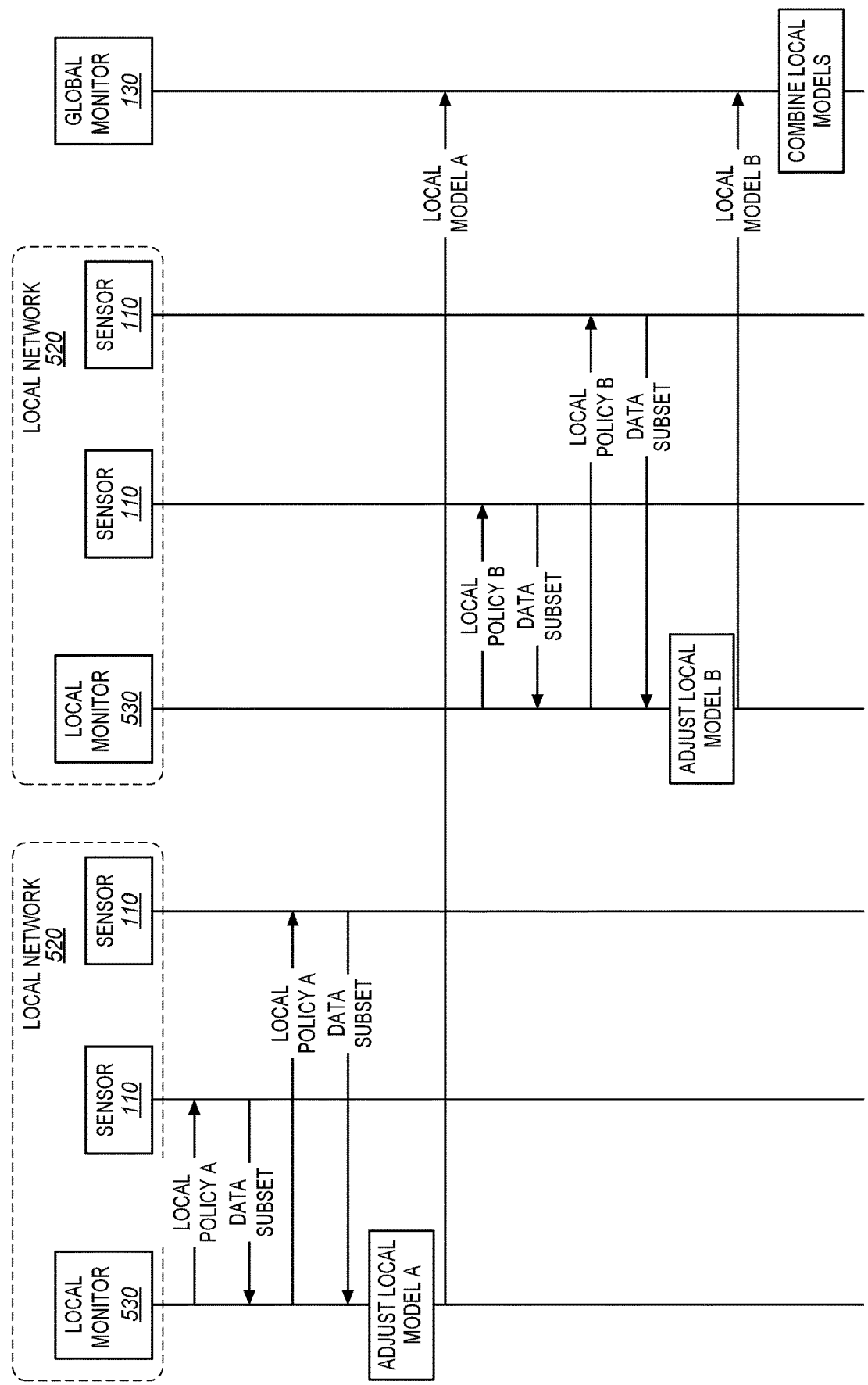
FIG. 9 is a message diagram illustrating communications between sensors, local monitors, and a global monitor in an illustrative embodiment.

FIG. 9 is a message diagram illustrating communications between sensors 110, local monitors 530, and global monitor 130 in an illustrative embodiment. For a peripheral topology, local monitors 530 send a local policy to sensors 110 in their respective local networks 520. For example, one local monitor 530 sends local policy A to sensors 110 within a local network 520, and another local monitor 530 sends local policy B to sensors 110 within a local network 520. Sensors 110 report a data subset to their respective local monitors 530 based on the local policy. Each data subset is limited to data targeted to the candidate element(s) in a local model as specified in the local policy. Local monitors 530 adjust their local models based on the data subsets reported by sensors 110, and report the local models to global monitor 130. For example, one local monitor 530 reports local model A to global monitor 130, and another local monitor 530 reports local model B to global monitor 130. Global monitor 130 may then combine the local models to build the global model.

Figure 10:
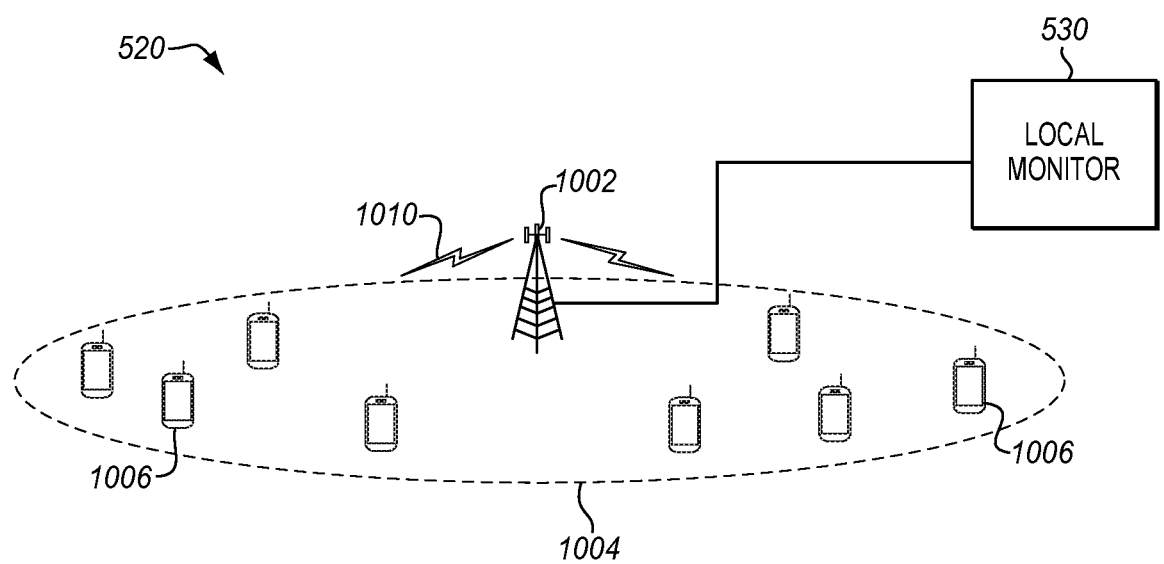
FIG. 10 illustrates a local network with a local monitor in an illustrative embodiment.

FIG. 10 illustrates a local network 520 with a local monitor 530 in an illustrative embodiment. In the peripheral topology as described above, a local monitor 530 performs active learning at the periphery of a larger network to regulate the data reported by sensors within local network 520. In this embodiment, local network 520 includes a base station 1002. Base station 1002 comprises an access network element (e.g., an eNodeB), that uses radio communication technology to communicate with a device on the licensed spectrum and interface the device with a core network (not shown). Base station 1002 is part of a Radio Access Network (RAN), such as an Evolved-UMTS Terrestrial Radio Access Network (E-UTRAN). Base station 1002 has a service area that is referred to as a cell 1004. Devices 1006 (i.e., User Equipment (UE)) located within cell 1004 are able to communicate with base station 1002 over the air interface 1010, which is the communication link between a UE and a base station. Devices 1006 are autonomous end terminals that operate as sensors, and are referred to as IoT devices that are configured for IoT communications over a network.

In this embodiment, local monitor 530 is implemented in base station 1002. To be implemented in base station 1002, local monitor 530 may be on the same platform as a controller of base station 1002, or may be in direct communication with base station 1002. Local monitor 530 sends a local policy to IoT devices 1006 in local network 520. IoT devices 1006 collect data, and process the local policy to determine what data to send to local monitor 530 via base station 1002, and what data not to send. Local monitor 530 receives the data from IoT devices 1006 according to the local policy, and adjusts a local model based on the data reported by IoT devices 1006. Local monitor 530 may also report the local model to a global monitor.

As an example of the peripheral approach, each local learner 612 transmits a local model F_i to global learner 212 (see FIG. 2 and FIG. 6). Global learner 212 combines the different local models F_i to form a single global model F. This may be done, in some embodiments, through ensemble learning with various algorithms, such as bagging (with majority vote), boosting, weighted sums, etc. For the sake of demonstration, the bagging approach may be as follows. Local models F_1, . . . , F_k generate the following predictions for labels l:

$$y_i(F_j, l, t) = p(\text{label}(v_i) = l | v_i(t-1), \ldots, v_i(1))$$

The prediction for $v_i$ is computed by:

$$y_i(F, t) = \mathrm{argmax}_l \sum_{j=1}^{k} y(F_j, l, t)$$

The label of $v_i$ is $y_i(F,t)$. The data that is transmitted from local learners 612 to global learner 212 is the local models F_1, . . . , F_k, whose complexity is lower than the data transmitted by sensors 110. Also, the transmission of a local model to global learner 212 may happen only when the local model has changed significantly enough to justify transmission. Because active learning is performed locally in local learner 612, the local models change every so often and a global threshold may be used to determine when a local learner 612 sends a local model to global learner 212. For example, let σ be some distance metric between two models of global learner 212. If $\sigma(F_i(t-1),F_i(t))>\varepsilon$, then local model $F_i(t)$ should be transmitted to global learner 212. In this way, the local models are transmitted only after enough active updates have occurred, which saves traffic on network 120.

Another architecture may be employed that is a hybrid of the centralized topology and the peripheral topology. In one embodiment, a global learner X assesses uncertainty in a global ensemble model (F_1, ..., F_k), and sends a global policy P to the local learners (X_1i, ..., X_ni). Each of the local learners assesses the portion of the global policy P, which is localized in its local model, in addition to its own policy P_i. Each of the local learners allows for an update of its local policy F_i according to global policy P.

Figure 11:
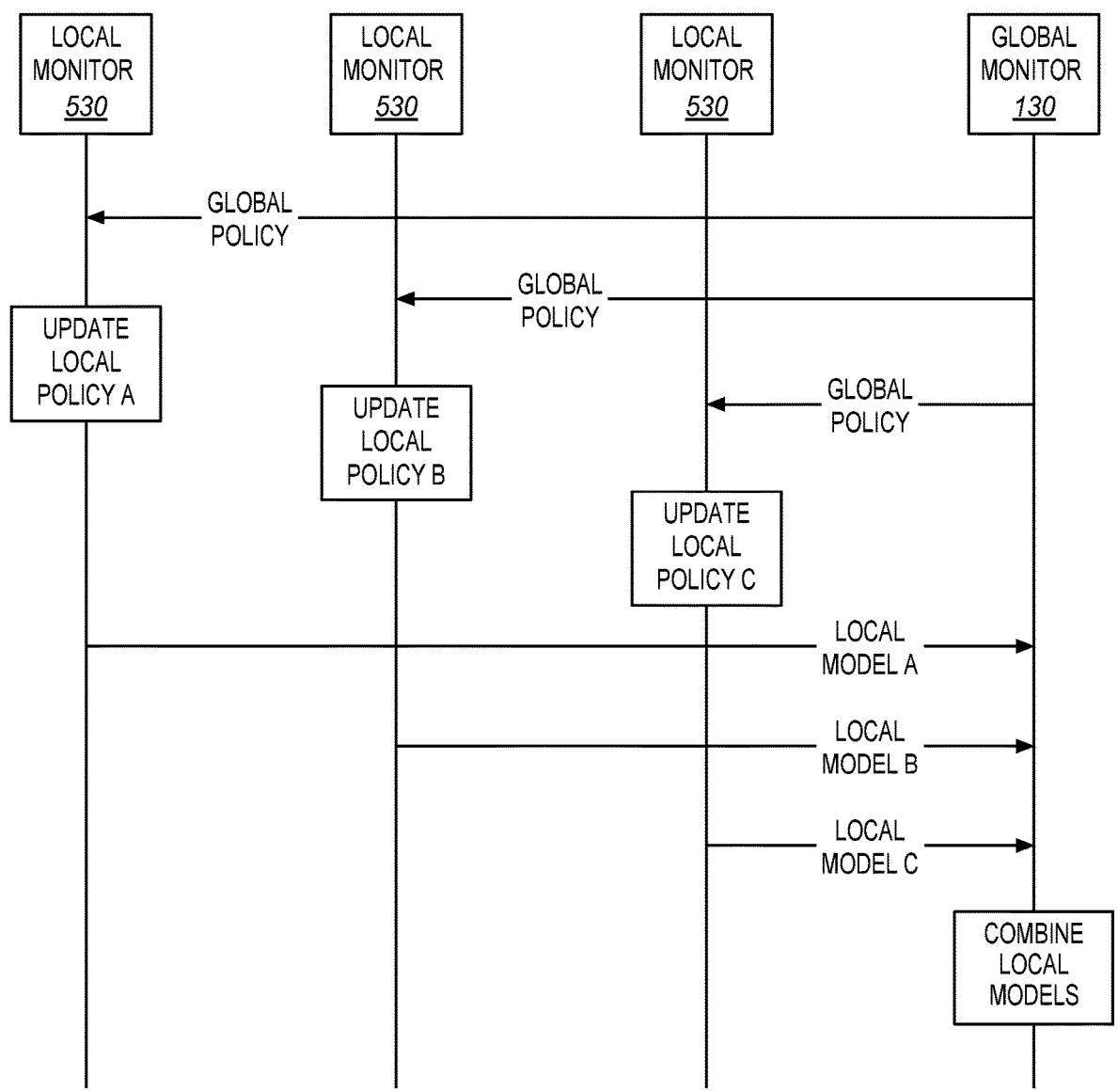
FIG. 11 is a message diagram illustrating communications between local monitors and a global monitor in an illustrative embodiment.

FIG. 11 is a message diagram illustrating communications between local monitors 530 and global monitor 130 in an illustrative embodiment. For a hybrid topology, global monitor 130 accesses a global model, selects one or more candidate elements in the global model, and generates a global policy specifying that the data requested from sensors 110 is limited to the data targeted to the candidate element(s) in the global model. Global monitor 130 then sends the global policy to local monitors 530. Local monitors 530 may access their own local models, select one or more candidate elements in the local model, and generate a local policy specifying that the data requested from sensors 110 (located in their local network) is limited to the data targeted to the candidate element(s) in the local model. Local monitors 530 may then update or adjust their local policy according to the global policy. For example, the global policy may request data targeted to element J while the local policy may request data targeted to element K. Thus, local monitors 530 may update their local policy to request data targeted to element J and element K. Local monitors 530 send a local policy to sensors 110 in their respective local networks 520, and receive data subsets based on the local policy. Local monitors 530 adjust their local models based on the data subsets reported by sensors 110, and report the local models to global monitor 130. For example, one local monitor 530 reports local model A to global monitor 130, another local monitor 530 reports local model B to global monitor 130, and another local monitor 530 reports local model C to global monitor 130. Global monitor 130 may then combine the local models to build the global model.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the disclosure is not limited to those specific embodiments. The scope of the disclosure is defined by the following claims and any equivalents thereof.

What is claimed is:

1. A system comprising:
a global monitor, including a processor and memory, configured to provide a data analytics service, the global monitor comprising:
a global interface component configured to communicate with a plurality of sensors over a wide area network; and
a global learner configured to perform an iterative process to build a global model for the data analytics service that maps elements to values based on data reported by the sensors;
for at least one iteration of the iterative process, the global learner is configured to generate a query for the data from the sensors, to select at least one candidate element from the elements in the global model based on a contribution of the at least one candidate element to improving the global model and based on an impact on the wide area network caused by the sensors reporting the data targeted to the at least one candidate element in the global model, to generate a global policy specifying that the data requested from the sensors is limited to the data targeted to the at least one candidate element in the global model, to send the query indicating the global policy to the sensors through global interface component, to receive the data targeted to the at least one candidate element in the global model from the sensors through the global interface component according to the global policy, and to adjust the global model based on the data targeted to the at least one candidate element in the global model.

2. The system of claim 1 wherein:
the global policy specifies a rate at which the sensors transmit the data targeted to the at least one candidate element in the global model over the wide area network.

3. The system of claim 1 wherein:
the global learner is further configured to select the at least one candidate element based further on a regulatory restriction on the data targeted to the least one candidate element.

4. The system of claim 1 further comprising:
the sensors;
wherein the sensors comprise Internet of Things (IoT) devices configured for IoT communications.

5. The system of claim 1 further comprising:
the sensors;
wherein the sensors comprise servers in a cloud network.

6. The system of claim 1 further comprising:
a plurality of local monitors, wherein each of the local monitors comprises:
a local interface component configured to communicate with a subset of the sensors located in a local network; and
a local learner configured to perform another iterative process to build a local model for the data analytics service;
for at least one iteration of the other iterative process, the local learner is configured to generate a query for the data from the subset of the sensors located in the local network, to select at least one candidate element in the local model based on a contribution of the at least one candidate element to improving the local model and based on an impact on the local network caused by the subset of the sensors reporting the data targeted to the at least one candidate element in the local model, to generate a local policy specifying that the data requested from the subset of the sensors is limited to the data targeted to the at least one candidate element in the local model, to send the query indicating the local policy to the subset of the sensors located in the local network through local interface component, to receive the data targeted to the at least one candidate element in the local model from the subset of the sensors through the local interface component according to the local policy, and to adjust the local model based on the data targeted to the at least one candidate element in the local model.

7. The system of claim 6 wherein:
the local learner is configured to send the local model to the global monitor through the local interface component.

8. The system of claim 7 wherein:
the global learner is configured to receive a plurality of local models from the local monitors through the global interface component, and to combine the local models to build the global model.

9. The system of claim 6 wherein:
the local learner is configured to send the local model to other local monitors through the local interface component.

10. The system of claim 6 wherein:
the local monitors are located on a periphery of the wide area network.

11. The system of claim 6 wherein:
at least one of the local monitors is implemented in a base station of a Radio Access Network (RAN).

12. A method of using active learning to regulate data traffic, the method comprising:
building, at a global monitor, a global model for a data analytics service that maps elements to values using an iterative process, wherein the global monitor communicates with a plurality of sensors over a wide area network;
for at least one iteration of the iterative process, the method comprises:
generating, at the global monitor, a query for data from the sensors;
selecting, at the global monitor, at least one candidate element from the elements in the global model based on a contribution of the at least one candidate element to improving the global model and based on an impact on the wide area network caused by the sensors reporting the data targeted to the at least one candidate element in the global model;
generating, at the global monitor, a global policy specifying that the data requested from the sensors is limited to the data targeted to the at least one candidate element in the global model;
sending the query indicating the global policy from the global monitor to the sensors;
receiving the data targeted to the at least one candidate element in the global model in the global monitor from the sensors according to the global policy; and
adjusting, at the global monitor, the global model based on the data targeted to the at least one candidate element in the global model.

13. The method of claim 12 wherein:
the global policy specifies a rate at which the sensors transmit the data targeted to the at least one candidate element in the global model over the wide area network.

14. The method of claim 12 wherein selecting the at least one candidate element comprises:
selecting the at least one candidate element based further on a regulatory restriction on the data targeted to the least one candidate element.

15. The method of claim 12 wherein:
the sensors comprise Internet of Things (IoT) devices configured for IoT communications.

16. The method of claim 12 wherein:
the sensors comprise servers in a cloud network.

17. The method of claim 12 further comprising:
building a local model for the data analytics service at each of a plurality of local monitors using another iterative process, wherein each of the local monitors communicates with a subset of the sensors located in a local network;
for at least one iteration of the other iterative process, the method comprises:
generating, at a local monitor of the plurality of local monitors, a query for the data from the subset of the sensors located in the local network;
selecting, at the local monitor, at least one candidate element in the local model based on a contribution of the at least one candidate element to improving the local model and based on an impact on the local network caused by the subset of the sensors reporting the data targeted to the at least one candidate element in the local model;
generating, at the local monitor, a local policy specifying that the data requested from the subset of the sensors is limited to the data targeted to the at least one candidate element in the local model;
sending the query indicating the local policy from the local monitor to the subset of the sensors located in the local network;
receiving the data targeted to the at least one candidate element in the local model in the local monitor from the subset of the sensors according to the local policy; and
adjusting, at the local monitor, the local model based on the data targeted to the at least one candidate element in the local model.

18. The method of claim 17 further comprising:
sending the local model from the local monitor to the global monitor.

19. The method of claim 18 further comprising:
receiving, at the global monitor, a plurality of local models from the local monitors; and combining, at the global monitor, the local models to build the global model.

20. The method of claim 17 further comprising:
sending the local model from the local monitor to other local monitors.

21. A system comprising:
a global monitor, including a processor and memory, configured to build a global model for a data analytics service that maps elements to values; and
a plurality of local monitors that each communicates with a subset of sensors located in a local network;
wherein each local monitor of the plurality of the local monitors is configured to perform an iterative process to build a local model for the data analytics service that maps at least one of the elements to the values;
wherein for at least one iteration of the iterative process, the local monitor is configured to generate a query for data from the subset of the sensors located in the local network, to select at least one candidate element in the local model based on a contribution of the at least one candidate element to improving the local model and based on an impact on the local network caused by the subset of the sensors reporting the data targeted to the at least one candidate element in the local model, to generate a local policy specifying that the data requested from the subset of the sensors is limited to the data targeted to the at least one candidate element in the local model, to send the query indicating the local policy to the subset of the sensors located in the local network, to receive the data targeted to the at least one candidate element in the local model from the subset of the sensors according to the local policy, and to adjust the local model based on the data targeted to the at least one candidate element in the local model;
wherein the global monitor is configured to receive a plurality of local models from the local monitors, and to combine the local models to build the global model.

22. The system of claim 21 wherein:
the local monitors are located on a periphery of a wide area network.

23. The system of claim 21 wherein:
the local monitor is further configured to select the at least one candidate element based further on a regulatory restriction on the data targeted to the least one candidate element.

24. The system of claim 21 wherein:
at least one of the local monitors is implemented in a base station of a Radio Access Network (RAN).

25. The system of claim 21 further comprising:
the sensors;
wherein the sensors comprise Internet of Things (IoT) devices configured for IoT communications over the local network.

26. The system of claim 21 further comprising:
the sensors;
wherein the sensors comprise servers in a cloud network.

27. The system of claim 21 wherein:
the local policy specifies a rate at which the subset of the sensors transmit the data targeted to the at least one candidate element in the local model over the local network.

28. The system of claim 21 wherein:
the global monitor is configured to select at least one candidate element in the global model based on a contribution of the at least one candidate element to improving the global model, to generate a global policy specifying that the data requested from the sensors is limited to the data targeted to the at least one candidate element in the global model, and to send the global policy to the local monitors; and
each of the local monitors is configured to update the local policy according to the global policy.

29. A method of using active learning to regulate data traffic, the method comprising:
building, at each of a plurality of local monitors, a local model for a data analytics service that maps elements to values using an iterative process, wherein each local monitor of the plurality of local monitors communicates with a subset of sensors located in a local network;
for at least one iteration of the iterative process, the method comprises:
generating, at the local monitor, a query for data from the subset of the sensors located in the local network;
selecting, at the local monitor, at least one candidate element of the elements in the local model based on a contribution of the at least one candidate element to improving the local model and based on an impact on the local network caused by the subset of the sensors reporting the data targeted to the at least one candidate element in the local model;
generating, at the local monitor, a local policy specifying that the data requested from the subset of the sensors is limited to the data targeted to the at least one candidate element in the local model;
sending the query indicating the local policy from the local monitor to the subset of the sensors located in the local network;
receiving the data targeted to the at least one candidate element in the local model in the local monitor from the subset of the sensors according to the local policy; and
adjusting, at the local monitor, the local model based on the data targeted to the at least one candidate element in the local model;
receiving, at a global monitor, a plurality of local models from the local monitors; and
combining, at the global monitor, the local models to build a global model for the data analytics service.

30. The method of claim 29 wherein:
the sensors comprise Internet of Things (IoT) devices configured for IoT communications over the local network.

31. The method of claim 29 wherein:
the sensors comprise servers in a cloud network.

32. The method of claim 29 wherein selecting the at least one candidate element comprises:
selecting the at least one candidate element based further on a regulatory restriction on the data targeted to the least one candidate element.

33. The method of claim 29 wherein:
the local policy specifies a rate at which the subset of the sensors transmit the data targeted to the at least one candidate element in the local model over the local network.

34. The method of claim 29 further comprising:
selecting, at the global monitor, at least one candidate element in the global model based on a contribution of the at least one candidate element to improving the global model;
generating, at the global monitor, a global policy specifying that the data requested from the sensors is limited to the data targeted to the at least one candidate element in the global model;

sending the global policy from the global monitor to the local monitors; and updating, at each of the local monitors, the local policy according to the global policy.

* * * * *